(12) United States Patent
Tsukihashi et al.

(10) Patent No.: US 7,796,495 B2
(45) Date of Patent: Sep. 14, 2010

(54) OPTICAL DISK

(75) Inventors: Akira Tsukihashi, Ora-gun (JP); Tsuyoshi Yamamoto, Ota (JP); Satoru Miyoshi, Ora-gun (JP); Shinichi Nakahashi, Ota (JP)

(73) Assignee: Sanyo Electric Co., Ltd., Osaka (JP)

( * ) Notice: Subject to any disclaimer, the term of this patent is extended or adjusted under 35 U.S.C. 154(b) by 1005 days.

(21) Appl. No.: 11/198,113

(22) Filed: Aug. 5, 2005

(65) Prior Publication Data
US 2006/0028967 A1 Feb. 9, 2006

(30) Foreign Application Priority Data
Aug. 9, 2004 (JP) ............... 2004-232345

(51) Int. Cl.
*G11B 3/70* (2006.01)
*G11B 5/84* (2006.01)
*G11B 7/26* (2006.01)
*G11B 7/20* (2006.01)
*G01D 15/14* (2006.01)
*B41J 2/435* (2006.01)

(52) U.S. Cl. .............. 369/272.1; 369/94; 347/224
(58) Field of Classification Search .......... 347/224
See application file for complete search history.

(56) References Cited

U.S. PATENT DOCUMENTS

| | | | |
|---|---|---|---|
| 6,160,787 A * | 12/2000 | Marquardt et al. | 369/275.1 |
| 6,320,840 B1 | 11/2001 | Oh et al. | |
| 6,826,139 B1 | 11/2004 | Oh et al. | |
| 6,931,654 B1 | 8/2005 | Oh et al. | |
| 7,070,860 B2 | 7/2006 | Kobayashi et al. | |
| 2003/0108708 A1 * | 6/2003 | Anderson et al. | 428/64.4 |
| 2003/0117932 A1 | 6/2003 | Morishima et al. | |
| 2003/0179679 A1 * | 9/2003 | Morishima | 369/108 |
| 2005/0099929 A1 | 5/2005 | Yamamoto et al. | |
| 2006/0193226 A1 | 8/2006 | Tsukihashi et al. | |

FOREIGN PATENT DOCUMENTS

| | | |
|---|---|---|
| CN | 1210337 A | 3/1999 |
| CN | 1214144 | 4/1999 |
| CN | 1416114 A | 5/2003 |
| CN | 1469377 | 1/2004 |
| JP | 2002-203321 | 7/2002 |
| JP | 2003-203348 | 5/2003 |
| JP | 2003-272240 | 9/2003 |

OTHER PUBLICATIONS

State Intellectual, Property Office of P.R. China, "Notification of First Office Action," (Feb. 10, 2006).
Final Office Action citing Publication No. US 2004/011473 A1, issued for U.S. Appl. No. 10/986,050, dated Jun. 2, 2008.
State Intellectual Property Office of P.R. China, Office Action dated May 18, 2007, (4 pages).

* cited by examiner

*Primary Examiner*—Wayne R Young
*Assistant Examiner*—Carl Adams
(74) *Attorney, Agent, or Firm*—Pillsbury Winthrop Shaw Pittman LLP

(57) ABSTRACT

An optical disk comprising two layers including a signal recording layer and an image recording layer further comprises a metal reflective layer formed on a surface of the image recording layer on the incidence side of laser light. The image recording layer is capable of forming a visible image in response to an increase in temperature caused by application of laser light to the metal reflective layer. The visible image is capable of being visually observed from a side opposite to the incidence side.

6 Claims, 3 Drawing Sheets

OPTICAL DISK

CROSS-REFERENCE TO RELATED APPLICATION

The entire disclosure of Japanese Patent Application No. 2004-232345 including the specification, claims, drawings, and abstract is incorporated herein by reference.

BACKGROUND OF THE INVENTION

1. Field of the Invention

The present invention relates to an optical disk on which a visible image can be formed by laser light applied from an optical pickup.

2. Description of the Related Art

Optical disk reproducing devices that read a signal recorded on a disk using an optical pickup are widely available, and, recently, optical disk recording and reproducing devices configured to include, in addition to the reproducing capability, the capability of recording a signal on a disk by laser light applied from an optical pickup have been introduced to the market.

When such an optical disk recording and reproducing device is used to record a signal on a disk, in order to identify the content of the signal recorded on the disk, it is necessary to read the signal recorded on the disk. To avoid such necessity, after completion of a signal recording operation, some users place, on a surface opposite to a recording surface of the disk, a label or the like having information of the recorded content printed thereon, for example, song titles, when music is recorded, while other users write song titles or the like on the non-recording surface using a felt-tipped pen or the like.

However, such methods including a step of placing a label or the like or of writing song titles or the like are inconvenient and can adversely affect the reproducing operation of the signal recorded on the disk. As a method to overcome such a problem, a technique for forming a visible image on a photosensitive surface of an optical disk by laser light has been developed.

Also, a technique that enables a visible image to be formed in multiple colors has been developed.

However, currently known techniques remain problematic in that, because a visible image is to be formed on a signal surface on which a data signal is recorded, when the recording capacity for data signals is large, the area for forming a visible image is reduced and it is usually impossible to display information sufficient to identify all recorded data. On the other hand, when the formation of a visible image on an optical disk is performed on a surface opposite to the signal recording surface of the disk, there is another problem in that users must inconveniently turn the disk upside down after completion of a recording operation of data onto the disk.

SUMMARY OF THE INVENTION

According to one aspect of the present invention, there is provided an optical disk comprising two layers including a signal recording layer and an image recording layer formed, in that order, from an incidence side on which laser light is incident, the optical disk further comprising a metal reflective layer formed on a surface of the image recording layer on the incidence side of laser light, wherein the image recording layer is capable of forming a visible image in response to an increase in temperature caused by application of laser light to the metal reflective layer, and wherein the visible image is capable of being visually observed from a side opposite to the incidence side.

BRIEF DESCRIPTION OF THE DRAWINGS

Preferred embodiments of the present invention will be described in further detail based on the following drawings, wherein.

DESCRIPTION OF PREFERRED EMBODIMENTS

The present invention is intended to provide an optical disk on which a visible image can be formed by laser light applied from a laser diode incorporated in an optical pickup.

Figure 1:
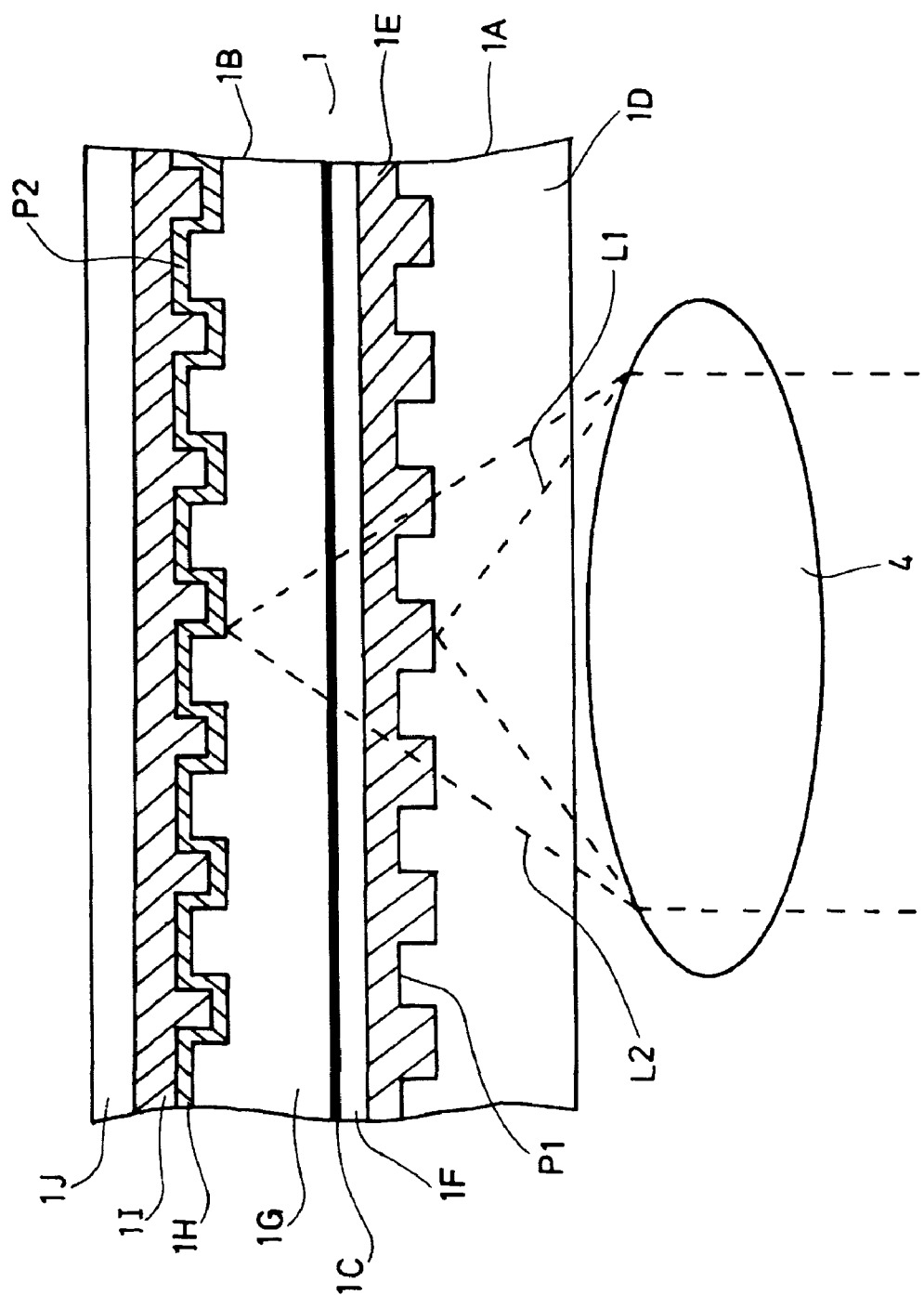
FIG. 1 is a cross-sectional view showing an optical disk according to an embodiment of the present invention.
Figure 2:
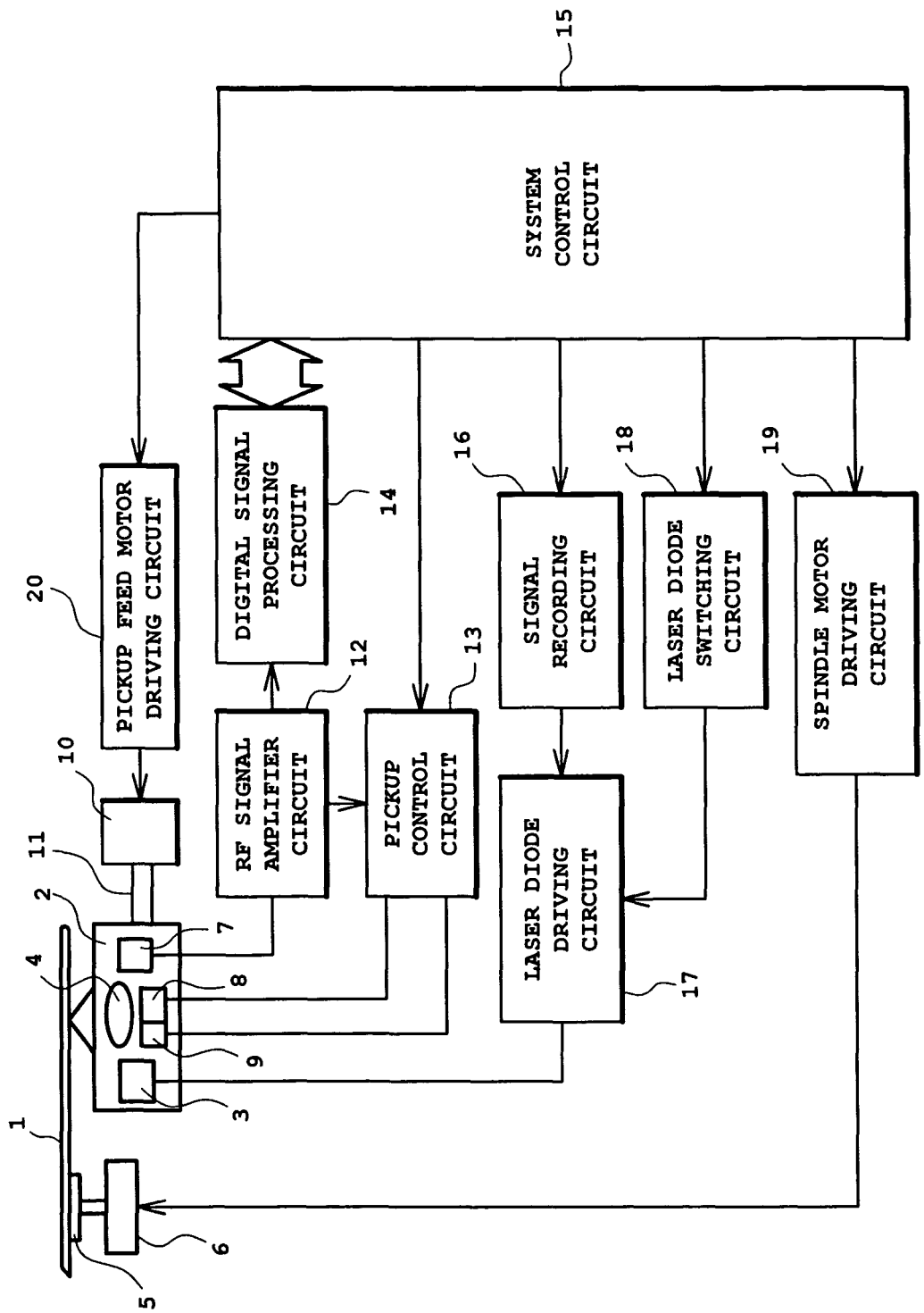
FIG. 2 is a block circuit diagram showing an optical disk recording and reproducing device that uses the optical disk according to the embodiment of the present invention.
Figure 3:
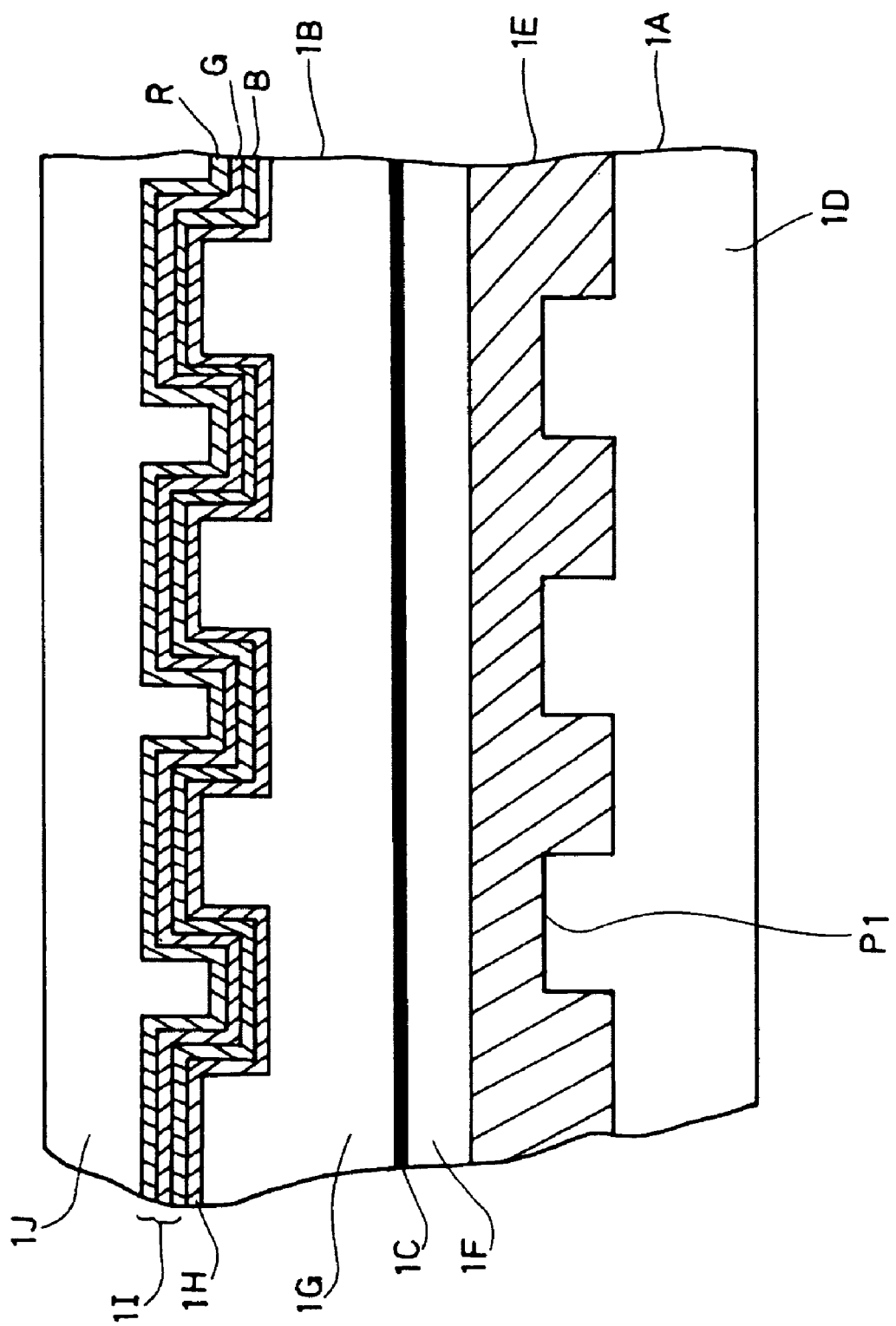
FIG. 3 is a cross-sectional view showing an optical disk according to another embodiment of the present invention.

FIG. 1 is a cross-sectional view showing an exemplary embodiment of an optical disk according to the present invention, FIG. 2 is a block circuit diagram showing an exemplary embodiment of an optical disk recording and reproducing device that uses the optical disk according to the present invention, and FIG. 3 is a cross-sectional view showing another exemplary embodiment of an optical disk according to the present invention.

An optical disk 1 can be manufactured by adhesively bonding a first disk 1A and a second disk 1B with a transparent adhesive 1C. The first disk 1A included in the optical disk 1 includes a transparent first protective layer 1D, a signal recording layer 1E for recording a signal, and a transparent second protective layer 1F, which are formed, in that order, from a light incidence side, being the side that receives laser light applied from a laser diode 3 incorporated in an optical pickup 2. The second disk 1B includes a transparent third protective layer 1G, a metal reflective layer 1H made of metal such as aluminum, an image recording layer 1I for forming a visible image through the change in color that occurs when the temperature is changed, and a transparent fourth protective layer 1J, which are formed, in that order, from the side on which the second disk 1B is adhesively bonded to the first disk 1A, that is, from the light incidence side that receives laser light applied from the laser diode 3.

As shown, the signal recording layer 1E provided in the optical disk 1 includes a pregroove P1 in which positional information data indicating the position on the disk is recorded, and which is formed in a spiral manner in the form of a track. The metal reflective layer 1H also includes a pregroove P2 in which positional information data indicating the position on the disk is recorded, and which is formed in a spiral manner in the form of a track.

The laser diode 3 incorporated in the optical pickup 2 is a two-wavelength laser that emits two types of laser light L1 and L2 having two different wavelengths. The laser light L1 has a wavelength shorter than that of the laser light L2. As shown in FIG. 1, the laser light L1 is focused on the signal recording layer 1E through the light converging function of an objective lens 4, and the laser light L2 is focused on the metal reflective layer 1H through the light converging function of the objective lens 4.

Referring now to FIG. 2, the optical disk 1 is placed on a turntable 5. The turntable 5 is configured such that rotation is driven by a spindle motor 6. A photodetector 7 is incorporated within the optical pickup 2. Laser light reflected from the signal recording layer 1E or the metal reflective layer 1H of the optical disk 1 is incident on the photodetector 7. The photodetector 7 converts a laser light signal to an electric signal.

A focusing coil 8 is incorporated in the optical pickup 2. The focusing coil 8 is used to change the position of the objective lens 4 in a direction perpendicular to the signal surface of the optical disk 1 so that the laser light L1 and the laser light L2 are focused on the signal recording layer 1E and the metal reflective layer 1H, respectively. A tracking coil 9 is incorporated in the optical pickup 2. The tracking coil 9 is used to change the position of the objective lens 4 in the direction of a radius of the optical disk 1 so that the laser light L1 and the laser light L2 are adjusted to follow the tracks formed in the signal recording layer 1E and the metal reflective layer 1H, respectively.

A pickup feed motor 10 is configured such that a feed screw 11 is rotationally driven to move the main body of the optical pickup 2 in the direction of the radius of the optical disk 1. In response to an RF (radio-frequency) signal provided through the conversion to an electric signal by the photodetector 7, an RF signal amplifier circuit 12 amplifies the RF signal. Further, the RF signal amplifier circuit 12 is configured to output a waveform-shaped and binarized signal. The RF signal amplifier circuit 12 also incorporates circuitry for generating a focus error signal and a tracking error signal from a signal obtained from the photodetector 7. Because such circuitry for generating various types of error signals is well known, the description thereof will be omitted.

A pickup control circuit 13 performs a focus control operation and a tracking control operation, respectively, based on the focus error signal and the tracking error signal generated from the RF signal amplifier circuit 12. The pickup control circuit 13 is configured to provide a driving signal to the focusing coil 8 and the tracking coil 9 that are incorporated in the optical pickup 2.

In response to a binarized signal output from the RF signal amplifier circuit 12, a digital signal processing circuit 14 performs digital signal processing on the signal read from the optical disk 1 to thereby obtain necessary data signals such as positional information data indicating the position on the disk, a synchronization signal, and the like. In response to a command signal, a data signal that is a recording signal containing data to be recorded, and an image data signal for forming a visible image, all of which are output from one or more host devices (not shown) such as a computer or the like, a system control circuit 15 controls various types of operations performed by the optical disk recording and reproducing device. A buffer memory (not shown) used for temporary storage of the data signal and the image data signal is incorporated in the system control circuit 15.

In response to a data signal, and an image data signal for forming a visible image output from the host equipment, a signal recording circuit 16 outputs recording signals based on the respective signals. The signal recording circuit 16 is configured to output a pulse signal for recording the data signal, and a shaped pulse signal for forming a visible image. A laser diode driving circuit 17 is configured such that, in response to a pulse signal output from the signal recording circuit 16, a driving signal corresponding to the pulse signal is supplied to the laser diode 3 incorporated in the optical pickup 2.

A laser diode switching circuit 18 is configured to perform switching in the laser diode driving circuit 17. When the signal recording layer 1E formed in the optical disk 1 is to be used, the laser diode driving circuit 17 supplies to the laser diode 3 a driving signal that causes the laser diode 3 to emit short wavelength laser light L1. When the metal reflective layer 1H is to be used for image formation, the laser diode driving circuit 17 supplies to the laser diode 3 a driving signal that causes the laser diode 3 to emit long wavelength laser light L2.

A spindle motor driving circuit 19 is configured such that the operation is controlled by the system control circuit 15, thereby controlling the spindle motor 6 to be rotationally driven. When a data signal is to be recorded on the optical disk 1, the spindle motor driving circuit 19 rotationally drives the spindle motor 6 so that the optical disk 1 is maintained to rotate at a constant linear speed using a synchronization signal read from the optical disk 1. When a visible image is to be formed, the spindle motor driving circuit 19 rotationally drives the spindle motor 6 to rotate at a constant angular speed. The system control circuit 15 also controls a pickup feed motor driving circuit 20. The pickup feed motor driving circuit 20 is configured to rotationally drive the pickup feed motor 10.

An optical disk recording and reproducing device that employs the optical disk 1 according to the present invention is configured as described above. Next, the operation of such an optical disk recording and reproducing device will be described. To perform a recording operation on the signal recording layer 1E provided in the optical disk 1 to record a data signal transmitted from the host equipment, the system control circuit 15 controls the laser diode switching circuit 18 so that the laser diode switching circuit 18 selects a mode in which the laser diode driving circuit 17 outputs a driving signal that causes switching of the laser diode 3 to a mode in which the laser diode 3 emits laser light as shown as the laser light L1.

The mode as described above is used to perform a recording operation. During this operation, the pickup control circuit 13 operates to control the focusing coil 8 so that focus control is performed to focus the laser light L1 on the signal recording layer 1E, and also operates to control the tracking coil 9 so that tracking control is performed to adjust the laser light L1 to follow the pregroove P1 formed in the signal recording layer 1E of the optical disk 1. In addition, the main body of the optical pickup 2 is moved for the tracking operation by rotationally driving the pickup feed motor 10. Further, the digital signal processing circuit 14 performs operations including the operation of sampling a synchronization signal from a wobble signal obtained from the pregroove P1. Because the control operations performed by these circuits are well known, the description thereof will be omitted.

In addition, when a signal is to be recorded on the optical disk 1, the laser power is adjusted to a suitable value for a recording operation of a signal to the signal recording layer 1E provided in the optical disk 1. A driving signal for adjusting laser light to have the suitable value of laser power is supplied from the laser diode driving circuit 17 to the laser diode 3. Further, the spindle motor driving circuit 19 rotationally controls and operates the spindle motor 6 using a synchronization signal obtained from a wobble signal, thereby rotationally driving the optical disk 1 at a desired constant linear speed.

A data signal, that is, a recording signal output from the host equipment, is temporarily stored in the buffer memory incorporated in the system control circuit 15. The temporarily stored data signal is then read and input to the signal recording circuit 16. After a data signal is input to the signal recording circuit 16, the signal recording circuit 16 performs encoding processing on the data signal. As a result, a signal obtained by converting the recording signal is output in the form of a pulse signal.

A pulse signal corresponding to the recording signal output from the signal recording circuit 16 is input to the laser diode driving circuit 17. The laser diode driving circuit 17 outputs to the laser diode 3 a driving signal corresponding to the pulse signal. After a driving signal is supplied to the laser diode 3, the laser diode 3 emits laser light L1. The laser light L1 is applied to the signal recording layer 1E. As a result, the data signal can be recorded to the signal recording layer 1E provided in the optical disk 1.

The recording operation of a data signal to the signal recording layer 1E is performed as described above. Next, an operation for forming a visible image in the image recording layer 1I will be described.

To form a visible image in the image recording layer 1I provided in the optical disk 1, the system control circuit 15 controls the laser diode switching circuit 18 so that the laser diode switching circuit 18 selects a mode in which the laser diode driving circuit 17 outputs a driving signal that causes switching of the laser diode 3 to a mode in which the laser diode 3 emits laser light as shown as the laser light L2.

The mode as described above is used to form a visible image. During this operation, the pickup control circuit 13 operates to control the focusing coil 8 so that focus control is performed to focus the laser light L2 on the metal reflective layer 1H, and also operates to control the tracking coil 9 so that tracking control is performed to adjust the laser light L2 to follow the pregroove P2 formed in the metal reflective layer 1H. In addition, the main body of the optical pickup 2 is moved to form a visible image by rotationally driving the pickup feed motor 10.

When a visible image is to be formed in the image recording layer 1I of the optical disk 1, the laser power is adjusted to a suitable value for forming a visible image in the image recording layer 1I of the optical disk 1. A driving signal for adjusting laser light to have the suitable value of laser power is supplied from the laser diode driving circuit 17 to the laser diode 3.

When the laser light L2 applied from the laser diode 3 is focused on the metal reflective layer 1H through the focus control performed by the pickup control circuit 13, the temperature at the focus point is increased. The heat thus generated is transmitted to the image recording layer 1I provided in contact with the metal reflective layer 1H. As a result, a change in color occurs in a portion of the image recording layer 1I in which the temperature is increased.

In this operation, the spindle motor driving circuit 19 controls the spindle motor 6 to rotate at a constant angular speed.

A visible image data signal for a visible image is output from the host equipment, and is temporarily stored in the buffer memory incorporated in the system control circuit 15. The temporarily stored data signal is then read and input to the signal recording circuit 16. After a visible image data signal is input to the signal recording circuit 16, the signal recording circuit 16 outputs a signal for forming a visible image in the form of a pulse signal.

A pulse signal corresponding to the visible image data signal output from the signal recording circuit 16 is input to the laser diode driving circuit 17. The laser diode driving circuit 17 outputs to the laser diode 3 a driving signal corresponding to the pulse signal. After a driving signal is supplied to the laser diode 3, the laser diode 3 emits laser light L2. The laser light L2 is applied to the metal reflective layer 1H. The laser light L2 is applied at a point whose position is adjusted through a position changing operation in which the pickup feed motor 10 performs movement control to move the main body of the optical pickup 2, and in which the tracking coil 9 performs drive control to drive the objective lens 4.

By controlling the position and time of application of the laser light L2 in the above-described manner, it is possible to increase the temperature at a desired position in the metal reflective layer 1H provided in the optical disk 1. As a result, a visible image can be formed in the image recording layer 1I. For example, after a data signal is recorded in the signal recording layer 1E, information indicating the contents of the recorded data signal can also be recorded in the image recording layer 1I in the form of a visible image. The visible image formed in the image recording layer 1I can be visually observed from a side opposite to the laser light incidence side of the optical disk 1. Accordingly, the signal recording circuit 16 has to be configured to output a visible image data signal modified with respect to the direction of visual observation.

Techniques for forming a visible image on an optical disk include a technique described in, for example, Japanese Patent Laid-Open Publication No. 2002-203321. The technique described therein can be used to form a visible image in the image recording layer 1I. According to the present invention, although laser light is focused at a point in the metal reflective layer 1H, because the color of the image recording layer 1I changes in response to the increase in temperature at the point of application of the laser light, it is possible to form a visible image in the image recording layer 1I.

In the optical disk 1 described above, a visible image can be formed in a single color. Next, another type of disk on which a visible image can be formed in multiple colors will be described with reference to FIG. 3.

Referring to FIG. 3, the image recording layer 1I has a three-layer structure. Specifically, the image recording layer 1I includes a blue color forming layer B, a green color forming layer G, and a red color forming layer R. In this structure, different materials having different color changing characteristics in response to temperature differences are used for the blue color forming layer B, the green color forming layer G, and the red color forming layer R.

Further, in order to adhesively bond the first disk 1A and the second disk 1B with the transparent adhesive 1C, it is preferable that an adhesive having wavelength dependent characteristics is used as the adhesive 1C. Laser light passing through an adhesive having wavelength dependent characteristics is separated depending on the wavelength of the laser light. Such adhesives having wavelength dependent characteristics are commercially manufactured and sold by several companies. When an adhesive used as the adhesive 1C has characteristics such that the adhesive does not allow transmission of short wavelength laser light L1, but allows transmission of long wavelength laser light L2, the laser light L1 used to perform a recording operation on the signal recording layer 1E is prevented from leaking to the side of the second disk 1B. As a result, the laser light L1 has no effect on the image recording layer 1I, and, in addition, a focus control operation and a tracking control operation can be precisely performed in order to perform a signal recording operation on the signal recording layer 1E.

Further, the optical disk 1 may also be formed so that the signal recording layer 1E is provided at a suitable depth for DVD standards, and the metal reflective layer 1H is provided at a suitable depth for CD standards. When the optical disk 1 having such a structure is used, it is possible to add an image recording capability to an optical disk recording and reproducing device that is compatible for both DVDs and CDs by modifying the laser diode driving circuit and other components in the recording and reproducing device.

Further, although an adhesive having wavelength dependent characteristics is used in the above-described embodiment, the present invention is not limited to this embodiment. As can be understood by those skilled in the art, a material having wavelength dependent characteristics may be used to form the second protective layer 1F and/or the third protective layer 1G. Additionally, or alternatively, the signal recording layer 1E may be preferably formed using such a material. When at least one of the second protective layer 1F, the third protective layer 1G, and the signal recording layer 1E is formed using a material that has wavelength dependent characteristics to provide high transmittance with respect to long wavelength laser light, short wavelength laser light used in a recording operation performed on the signal recording layer 1E does not pass through the layer(s). As a result, undesired influence of laser light on the image recording layer 1I can be eliminated.

As described above, after the recording of a data signal onto an optical disk is completed, a visible image indicating the contents of the recorded data signal or the like, such as characters or other symbols, can be formed without interruption, and without the need to turn the optical disk upside down. Therefore, it is possible to improve the convenience of use.

Further, because the metal reflective layer is formed on a surface of the image recording layer on the side that receives laser light, the metal reflective layer blocks light coming from the incidence side on which laser light is incident. Therefore, it is possible to improve the visibility of an image formed in the image recording layer.

Further, a visible image indicating the contents of a data signal recorded on the signal recording layer can be formed on the entire surface of an optical disk.

Further, because a pregroove having positional information data recorded therein is formed in the metal reflective layer, the position on the disk can be detected, and a tracking servo operation can be performed. Therefore, it is possible to accurately record an image in the image recording layer.

Further, when the image recording layer is formed of multiple layers that are capable of producing different colors, it is possible to form a colorful visible image.

Further, when the first disk including the signal recording layer and the second disk including the image recording layer are adhesively bonded using a wavelength dependent adhesive, it is possible to eliminate the influence exerted on the image recording layer by laser light emitted to record a signal to the signal recording layer.

What is claimed is:

1. An optical disk comprising layers including a signal recording layer, a metal reflective layer, and an image recording layer formed sequentially from an incidence side on which laser light is incident, wherein
    the signal recording layer is capable of recording data by application of the laser light from the incidence side,
    the image recording layer is capable of forming a visible image in response to an increase in temperature, caused by application of the laser light from the incidence side, to the metal reflective layer, and
    a pregroove in which positional information data indicating a position on the disk is recorded separately from the signal recording layer is formed on the metal reflective layer, and when forming the visible image, tracking control is performed using the pregroove independently from the signal recording layer, and the disk is rotationally driven at a constant angular speed.

2. The optical disk according to claim 1, wherein the image recording layer includes multiple layers that are capable of producing different colors.

3. The optical disk according to claim 1, wherein the signal recording layer is provided in a first disk, and the image recording layer is provided in a second disk, and wherein
    the optical disk is formed by adhesively bonding the first disk and the second disk.

4. The optical disk according to claim 3, wherein the first disk and the second disk are adhesively bonded with an adhesive having wavelength dependent characteristics.

5. The optical disk according to claim 4, wherein the adhesive is an adhesive having wavelength dependent characteristics that allow transmission of light having a longer wavelength than that of laser light used in recording to the signal recording layer.

6. The optical disk according to claim 1, wherein the signal recording layer is formed using a material having wavelength dependent characteristics that allow transmission of light having a longer wavelength than that of laser light used in recording to the signal recording layer.

* * * * *